United States Patent
Rakhimov

(10) Patent No.: US 11,853,383 B2
(45) Date of Patent: *Dec. 26, 2023

(54) SYSTEMS AND METHODS FOR GENERATING A SNAPSHOT VIEW OF VIRTUAL INFRASTRUCTURE

(71) Applicant: Bank of Montreal, Toronto (CA)

(72) Inventor: Rinat Rakhimov, Toronto (CA)

(73) Assignee: BANK OF MONTREAL, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,898

(22) Filed: Dec. 27, 2021

(65) Prior Publication Data

US 2022/0197968 A1 Jun. 23, 2022

Related U.S. Application Data

(63) Continuation of application No. 16/664,404, filed on Oct. 25, 2019, now Pat. No. 11,210,361.

(Continued)

(51) Int. Cl.
*G06F 16/957* (2019.01)
*G06F 16/2455* (2019.01)
*G06F 16/11* (2019.01)

(52) U.S. Cl.
CPC ........ *G06F 16/9577* (2019.01); *G06F 16/128* (2019.01); *G06F 16/24561* (2019.01)

(58) Field of Classification Search
CPC ........... G06F 16/9577; G06F 16/24561; G06F 16/128; G06F 2201/83; G06F 16/11;

(Continued)

(56) References Cited

U.S. PATENT DOCUMENTS

| | | | |
|---|---|---|---|
| 8,769,102 B1* | 7/2014 | Zhou | G06F 11/3696 709/225 |
| 2006/0095276 A1* | 5/2006 | Axelrod | G06Q 99/00 717/104 |

(Continued)

OTHER PUBLICATIONS

Examination Report for CA 3060771 dated Mar. 12, 2021 (6 pages).
1st Examiner's Requisition for CA App. 3,160,094 dated Aug. 22, 2023 (5 pages).

*Primary Examiner* — Evan Aspinwall
(74) *Attorney, Agent, or Firm* — FOLEY & LARDNER LLP

(57) ABSTRACT

A computer may receive a request to generate a snapshot view of a virtual infrastructure. The virtual infrastructure may comprise a plurality of virtual server management applications, each managing a respective set of virtual machines. The computer may implement a multi-threaded process to contemporaneously query one or more databases and retrieve status and other information of the virtual machines from different virtual server management applications. The computer may aggregate the retrieved information to determine the summary counters and statistic information for the virtual machines. The computer may generate a snapshot view file based on the retrieved information. The snapshot view file may be in hypertext markup language (HTML) format. The computer may transmit a selectable link to the snapshot view file to multiple user devices. A user may select the link and the respective user device may display the snapshot view in an application such as a web browser.

18 Claims, 5 Drawing Sheets

Related U.S. Application Data

(60) Provisional application No. 62/754,298, filed on Nov. 1, 2018.

(58) Field of Classification Search
CPC ....... G06F 11/1458; G06F 2009/45575; G06F 2009/45583; G06F 11/1453; G06F 2201/84; G06F 2201/815; G06F 16/188; G06F 9/45558; G06F 11/1451
USPC .......................................................... 707/649
See application file for complete search history.

(56) References Cited

U.S. PATENT DOCUMENTS

| | | | |
|---|---|---|---|
| 2008/0201479 A1* | 8/2008 | Husain | H04L 67/34 718/1 |
| 2011/0055712 A1 | 3/2011 | Tung et al. | |
| 2015/0142747 A1* | 5/2015 | Zou | G06F 11/1464 707/649 |
| 2016/0019081 A1* | 1/2016 | Chandrasekaran | G06F 9/45558 718/1 |
| 2016/0162320 A1* | 6/2016 | Singh | G06F 9/5055 718/1 |
| 2018/0095846 A1 | 4/2018 | Sanakkayala et al. | |
| 2018/0113622 A1 | 4/2018 | Sancheti | |

* cited by examiner

SYSTEMS AND METHODS FOR GENERATING A SNAPSHOT VIEW OF VIRTUAL INFRASTRUCTURE

CROSS REFERENCE TO RELATED APPLICATIONS

This application is a continuation application of U.S. patent application Ser. No. 16/664,404, filed Oct. 25, 2019, which claims priority to U.S. Provisional Application No. 62/754,298, filed on Nov. 1, 2018, each of which is incorporated herein in its entirety for all purposes.

TECHNICAL FIELD

This application relates generally to a tool for maintaining and monitoring virtual infrastructures.

BACKGROUND

Enterprise network infrastructures are quite complex containing interconnected but geographically distributed network computers and other network resources. For example, a modern day enterprise may have multiple datacenters and/or server farms. Furthermore, a single server farm or a datacenter may contain several servers and several other computing resources. The servers may be blade servers or standard rack servers. Each server may comprise multiple virtual machines, which further increase the complexity of a typical enterprise network infrastructure. Monitoring and managing a complex enterprise network infrastructure becomes a complex operation in itself. Furthermore, enterprises may employ virtualization techniques to combine hardware and software network resources and network functionality into a single, software-based administrative entity, a virtual infrastructure. Such a virtual infrastructure may comprise multiple data centers, web servers, virtual machines, and other network elements. Thus, monitoring and managing such virtual infrastructure becomes a more complex operation.

The conventional solutions for monitoring and managing a complex enterprise virtual infrastructure have several technical shortcomings. For example, a conventional solution may require a multi-step process to configure reports starting from selecting a respective view through report template and scheduling to generate actual report instances and saving the reports in PDF (portable document format) and CVS (comma-separated values) format. Although the report contents may be rich and informative, especially when it comes to drilling down to each virtual machine (VM) configuration details, the overall process is quite complex and requires the interaction with the application user interface (UI).

Additionally, the conventional solutions do not provide an integrated snapshot view containing the relevant information of multiple virtual machines needed by a system administrator. For example, the conventional solutions may drill down to each and every single virtual machine configurations, and provide detailed information for each particular virtual machine, which may be excessive. However, the conventional solutions may fail to provide the most critical and the most important information in one screenshot and in a user-friendly manner. Conventional systems do not illustrate one consolidated snapshot view of all different individual VM statistics as well as the storage utilization information relevant to system administrators. The information pieces received from different devices and databases of the virtual infrastructure may be scattershot. The system administrator may have to manually sift through the received information to retrieve relevant information.

Furthermore, conventional systems require specialized software and hardware resources. Specialized software may be required to interface with the webserver or database server to generate and display results based on the gathered information. For example, the conventional solutions, including RVTools, Turbonomic, Veeam Management Pack for SCOM and VirtualMetric, may either require the installation of some specific binaries, thick clients as well as the interaction with the application UI or have other operating system (OS) component dependencies and/or sophisticated backend infrastructure including databases which, in turn, add another layer of complexity from the management perspective. The conventional setup with additional hardware and software resources may be slow, inefficient, and bulky to maintain.

SUMMARY

What is therefore desired is a system and method that generates a snapshot view of various virtual network resources with the relevant information. What is further desired is an agentless system and method that generates the snapshot view without requiring specialized software and hardware resources.

Embodiments disclosed herein provide solutions to the aforementioned problems and provide other solutions as well. A computer may receive a request to generate a snapshot view of a virtual infrastructure. The virtual infrastructure may comprise a plurality of data centers with each data center comprising a plurality of virtual machines. One or more virtual server management applications (e.g., VMWare's vCenter Server applications) may be associated with corresponding sets of virtual machines of the plurality of virtual machines. A virtual server management application may be hosted on a data center and may manage virtual machines in the data center and/or in other data centers. The computer may implement a multi-threaded and/or a sequential process to query a database associated with one or more virtual server management applications and retrieve status and other information of the respective virtual machines from different data centers.

The retrieved information may be the most important and critical information from the perspective of an administrative user. Such information may comprise virtual machine status (e.g., power on or power off) and the storage utilization information. The computer may aggregate the retrieved information to determine the summary counters and statistic information for each virtual server management application. The computer may generate a snapshot view file based on the retrieved information. The snapshot view file may be in hypertext markup language (HTML) format. The computer may transmit a selectable link to the snapshot view file to multiple user devices. A user, such as a system administrator, may select the link and the respective user device may display the snapshot view in an application such as a web browser.

In an embodiment, a computer-implemented method for generating a snapshot view containing virtual machine information and status of a virtual infrastructure, the method comprising: receiving, by a computer, a request to generate the snapshot view, wherein the request includes an input text file containing identifiers of a plurality of virtual machines in a plurality of data centers in a network infrastructure; during a first operation executed by the computer: querying, by the computer from a database, a storage location corresponding to a first virtual server management application in a first data center of the plurality of data centers to retrieve a first set of data records containing information and status of a first set of virtual machines of the plurality of virtual machines within the network infrastructure; during a second operation executed by the computer: querying, by the computer from the database, a storage location corresponding to a second virtual server management application in a second data center of the plurality of data centers to retrieve a second set of data records containing information and status of a second set of virtual machines of the plurality of virtual machines within the network infrastructure; generating, by the computer, a hypertext markup language snapshot view file of the virtual infrastructure based upon the first and second sets of data records, the virtual infrastructure being formed by the first and second set of virtual machines; and transmitting, by the computer to a user device, an electronic communication containing a selectable link configured to retrieve the snapshot view file from the computer and cause the user device to generate the snapshot view using the snapshot view file.

In another embodiment, a system comprises a non-transitory storage medium configured to store a snapshot view engine; a processor connected to the non-transitory storage medium and configured to execute the snapshot view engine to: receive a request to generate the snapshot view, wherein the request includes an input text file containing identifiers of a plurality of virtual machines in a plurality of data centers in a network infrastructure; during a first operation executed by the computer: query, from a database, a storage location corresponding to a first virtual server management application in a first data center of the plurality of data centers to retrieve a first set of data records containing information and status of a first set of virtual machines of the plurality of virtual machines within the network infrastructure; during a second operation executed by the computer: query, from the database, a storage location corresponding to a second virtual server management application in a second data center of the plurality of data centers to retrieve a second set of data records containing information and status of a second set of virtual machines of the plurality of virtual machines within the network infrastructure; generate a hypertext markup language snapshot view file of the virtual infrastructure based upon the first and second sets of data records, the virtual infrastructure being formed by the first and second set of virtual machines; and transmit, to a user device, an electronic communication containing a selectable link configured to retrieve the snapshot view file from the computer and cause the user device to generate the snapshot view using the snapshot view file.

BRIEF DESCRIPTION OF THE DRAWINGS

The accompanying drawings constitute a part of this specification and illustrate embodiments of the subject matter disclosed herein.

DETAILED DESCRIPTION

Figure 1:
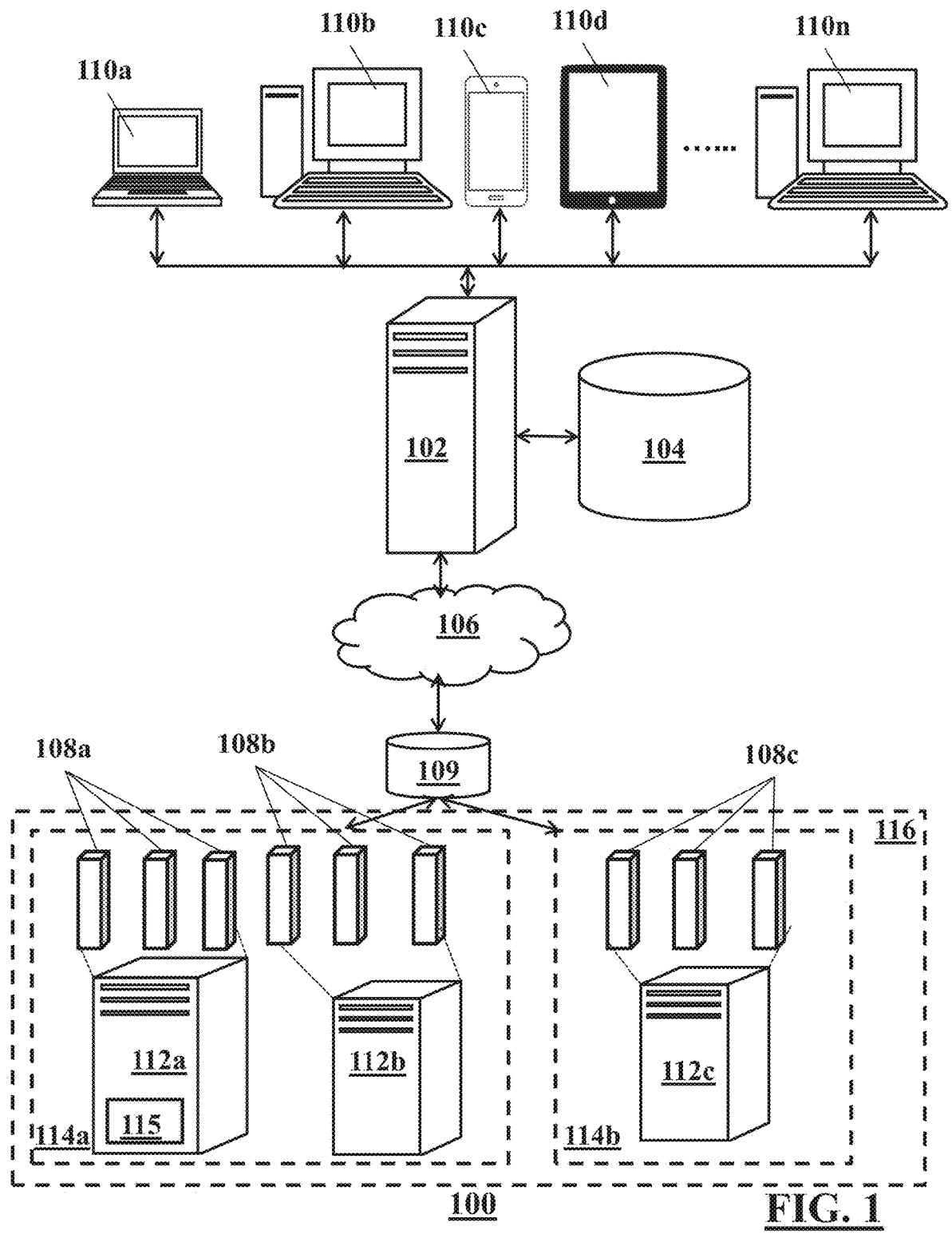
FIG. 1 shows an illustrative network environment in which a server generates a snapshot view of a virtual infrastructure.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein generate and present a snapshot view of a virtual infrastructure using a one-click approach. Instead of executing complex protocols, a user, such as a system administrator, may launch a single copy of a snapshot view engine on a computer. In response, the computer may query a remote virtual center database (e.g., VMware proprietary databases or VMware central databases) of various virtual machines within a virtual infrastructure to retrieve virtual inventory statistics from remote data centers, including storage utilization as well as thorough individual virtual machines (VMs) statistics such as VM virtual hardware and software information.

The snapshot engine may run on an application server interfacing a virtual infrastructure. The virtual infrastructure may be managed by multiple engineering and operation teams in various locations across the enterprise, including data centers and some office towers. In some embodiments, the virtual infrastructure may be, based on the VMware vSphere vCenter Servers. VMware vSphere may leverage the power of virtualization to transform datacenters into simplified cloud computing infrastructure and may enable IT organizations to deliver flexible and reliable IT services. A virtual server management application (e.g., vCenter Servers) represents a virtual infrastructure management framework, allowing system administrators provision and monitor virtual machines as well as proving high availability and load balancing functionality.

The snapshot engine may sequentially collect virtual inventory statistics from remote virtual infrastructure. The report may provide some relevant virtual server management application summary counters including storage utilization as well as thorough individual VM statistics such as VM virtual hardware and software information.

The report may be in HTML format and be stored either on the remote web server or locally. The snapshot engine may effectively represent the report content in a consolidated view which is easily portable and searchable in a standard web browser and does not require any specific thick client or user interface (UI). Report format may comply with HTML5 standards and can be seamlessly accessed by one click in any web browser and operating system (OS) including mobile devices and does not require any specialized software.

The snapshot engine may be able to collect the reports from a single or multiple remote virtual server management applications that may be managing respective plurality of virtual machines across multiple data centers. The snapshot engine may utilize RESTful API (application programming interface) to upload newly generated reports on SharePoint 2013 site. There may be a retention mechanism allowing reports rotation on the SharePoint as per defined retention settings. The snapshot engine may also send email notifications containing links to newly collected reports as well as reports archives to selected distribution lists. All previous reports are stored in accordance with the retention policies.

The computer may execute the snapshot view engine as a multi-threader. In other words, the computer may spin multiple threads of operations, with each thread of operation querying a database associated with a virtual server management application and retrieving information corresponding to a plurality of virtual machines being managed by the virtual server management application. Using the multi-threaded approach, the computer may collect data from virtually unlimited number of virtual server management applications within a reasonable time-frame. The only limits imposed on the computer for such multi-threaded operation is hardware capability of the computer and the network resources and the throughput capability of the enterprise network infrastructure. In some embodiments, the computer may execute the snapshot view engine to sequentially query databases associated different virtual server management applications to retrieve information about the virtual machines being managed by the virtual server management applications.

FIG. 1 shows an illustrative network environment 100, according to an exemplary embodiment. The snapshot view of a virtual infrastructure may be generated within the illustrative network environment 100. The network environment 100 may comprise an application server 102, a storage 104, network 106, a virtual center database 109, a virtual infrastructure 116 comprising a plurality of data centers 114a, 114b, and a plurality of user devices 110a, 110b, 110c, 110d, . . . 110n (collectively or commonly referred to as 110). Each data center may comprise a plurality of hosts. For example, a first data center 114a may comprise one or more hosts 112a, 112b. A second data center 114b may comprise one or more hosts 112c. Each host may comprise a plurality of virtual machines 108a, 108b, and 108c (collectively or commonly referred to as 108). The host may be a standard rack server or a blade server. In the virtual infrastructure 116, one of the hosts 112a, 112b, 112c may be a primary server having a virtual server management application (e.g., vCenter Server application) installed in it. It should be understood that the illustrative network environment 100 is merely an example, and other network environments with additional, substitute, or lesser components should be considered to be within the scope of this disclosure.

The application server 102 may be any computing device comprising a processor and non-transitory machine-readable storage capable of executing the various tasks and processes described herein. The application server 102 may receive requests to generate a snapshot view from one or more of the client devices 110 or launch a respective task automatically within its own address space on a scheduled basis. Non-limiting examples of such computing devices may include workstation computers, laptop computers, server computers, and the like. While the illustrative network environment 100 includes a single application server 102, it should be appreciated that that in some embodiments the application server 102 may include any number of computing devices operating in a distributed computing environment.

The storage 104 may be any type of database containing files utilized for implementing one or more operations within the network environment 100. For example, the storage 104 may contain application binaries, log files, and/or any other type of files used by the application serve 102 implementing one or more operations. Although the illustrative network environment 100 shows the storage 104 apart from the application server 104, the storage 104 may be located within the application server 102 itself.

The network 106 may be any type of communication medium such as a local area network (LAN), metropolitan area network (MAN), and/or a wide area network (WAN). For instance, the network 106 may be the internet. The network 106 may be a combination of various wired and wireless links capable of carrying data packets in between the application server 102 and the virtual machines 108.

The virtual infrastructure 116 may allow for multiple logical servers. A physical server may not usually be used to the point that its resource limits are reached. The virtual infrastructure 116 comprising multiple logical servers may allow for sharing and distribution such resources. The virtual infrastructure 116 may make use of these resources by running multiple logical servers that together can make use of the actual capacity of the host (e.g., physical server). The virtual infrastructure 116 may comprise multiple data centers 114a, 114b. The multiple data centers 114a, 114b may be located either in one or multiple physical locations. Each data center may comprise a plurality of hosts 112a, 112b, and 112c. A host 112a, 112b, 112c may be any computing device comprising a processor and non-transitory machine-readable storage. Each host 112a, 112b, 112c may have multiple virtual machines 108. For example, host 112a may have virtual machines 108a, host 112b may have virtual machines 108b, and host 112c may have virtual machines 108c. Each of the virtual machines 108 may contain a plurality of hardware and software resources. For example, a virtual machine 108 may have four core resources: CPU, memory, network, and storage (disk). These resources are granted to the virtual machine through the configuration of the virtual hardware. Each virtual machine may have different operating systems and hardware platforms.

The virtual infrastructure 116 may comprise a virtual server management application 115, called vCenter Server application, to monitor the virtualized environments. The virtual server management application 115 may provide centralized management and operation, resource provisioning and performance evaluation of virtual machines residing on the virtual infrastructure. The virtual server management application 115 may be installed at the primary server of virtual infrastructure 116 and operate as the virtualization or virtual machine manager for that environment. For example, host 112a may be the primary server of the virtual infrastructure 116. The virtual server management application 115 may be installed on host 112a. The virtual server management application 115 may provide data center administrators and a central management console to manage all the system's virtual machines. For example, the virtual server management application 115 may manage virtual machines 108a in the host 112a and/or one or more of the virtual machines 108b (in a different host 112b of the same datacenter 114a) and virtual machines 108c (in a different datacenter 114*b*). Therefore, the virtual server management application 115 may not be confined to managing the virtual machines 108*a*.

The virtual server management application 115 may provide statistical information about the resource use of each of the virtual machines 108 and provision the ability to scale and adjust the compute, memory, storage and other resource management functions from a central application. The virtual server management application 115 manages the performance of each virtual machine against specified benchmarks, and optimizes resources wherever required to provide consistent efficiency throughout the networked virtual architecture. Besides routine management, the virtual server management application 115 also ensures security by defining and monitoring access control to and from the virtual machines, migration of live machines, and interoperability and integration among other web services and virtual environments.

The virtual center database 109 may be any type of database containing information utilized for implementing one or more operations within the network environment 100. For example, the virtual center database 109 may store statistical information about the resource usage of each virtual machine provided/monitored by the virtual server management application 115, and/or any other type of performance information of each virtual machine. In some embodiments, the resource usage and performance information of all data centers and their different virtual machines are stored in one virtual center database. In some other embodiments, the virtual center database 109 may comprise a number of databases with each separate database corresponding to an individual data center and its virtual machines.

The user devices 110 can be any kind of computing devices. Non-limiting examples of user devices may include laptop computer 110*a*, desktop computers 110*b*, 110*n*, smartphone 110*c*, and tablet computer 110*d*. The user devices 110 may communicate with the application server 102 to transmit a request to generate a snapshot view of a virtual infrastructure. Furthermore, the user devices 110 may receive a snapshot view file or a link to a snapshot view file and display a snapshot view.

Figure 2:
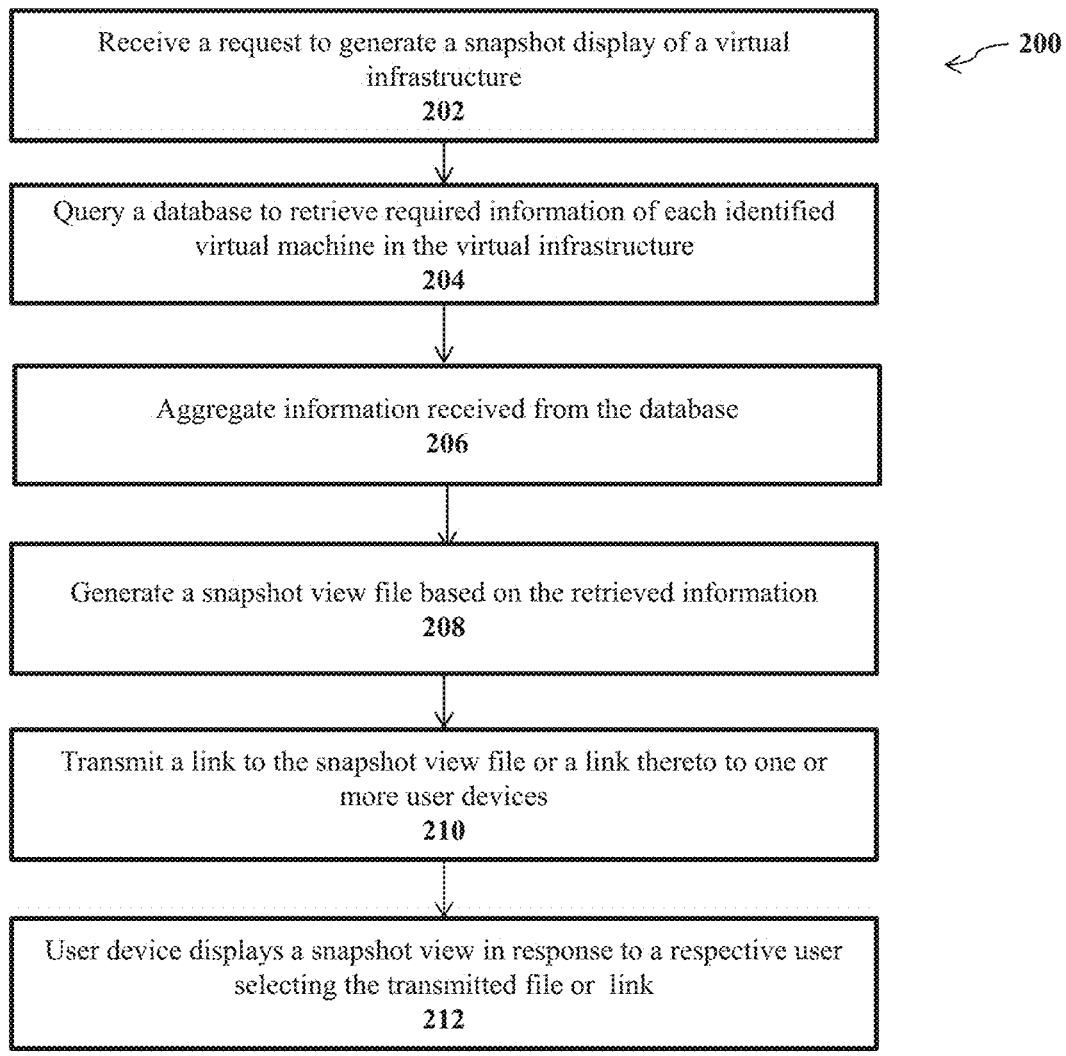
FIG. 2 shows an illustrative flow diagram of a method to generate a snapshot view of a virtual infrastructure.

FIG. 2 shows a flow diagram 200 of a method for generating a snapshot view of a virtual infrastructure, according to an illustrative embodiment. Although multiple computers may execute the steps of the method shown in the flow diagram 200, this description details, for brevity, a computer executing the steps of the method. It should also be understood that the method steps described below are merely illustrative and additional, alternate, and/or lesser number of steps should be considered to be within the scope of this disclosure.

The method may begin at step 202, where the computer (e.g., application server) may receive a request to generate a snapshot display of a virtual infrastructure. In some instances, the request may be in the form of an executable binary file placed for automated runs in a computer. For example, if the computer is a Windows machine, a user (such as a system administrator) may place the executable binary file in the Task Scheduler for automated runs. In other instances, the user may manually launch the executable binary file from a command line interface (CLI) such as Windows Powershell, command line shell, Apple Commandshell, and Linux Bash. In yet other instances, the user may click on an icon displayed by the computer in a graphical user interface (GUI), and, the computer may execute the executable binary in response to receiving the click.

In addition to launching the executable binary file by any of the aforementioned actions, the user may also provide an input text file containing identifiers of a list of data centers and/or a list of virtual machines. As discussed above, the virtual infrastructure may comprise multiple data centers, with each data center comprising a plurality of virtual machines. The virtual machines may be managed by one or more virtual server management applications. The identifiers of the list of data centers and/or the list of virtual machines may identify resources to be queried by the computer. In addition, the user may specify what information is required for each virtual machine. The required information for each VM may be VM status, VM tools, VM versions, VM operating systems, IP (internet protocol) addresses, virtual CPU, RAM, storage utilization, virtual Disk, snaps, parent VM folders, and the like.

In some embodiments, the user may request the statistic information of each data center comprising a plurality of virtual machines. The user may only request partial information of each virtual machine, such as the most important and critical information from the perspective of an administrator. Such information may comprise virtual machine status (e.g., power on or power off) and the storage utilization information. In some other embodiment, the user may request detailed thorough information regarding each individual virtual machine. The aforementioned techniques of the computer receiving the list of data centers and/or virtual machines are merely illustrative and other techniques should be considered within the scope of this disclosure.

In step 204, the computer may query the virtual center database for required information of each virtual machine. In some embodiments, one virtual center database stores relevant information of all data centers and their virtual machines. In some other embodiments, the virtual center database may comprise a number of databases with each separate database corresponding to an individual virtual server management application and the associated virtual machines. No matter the relevant information of different data centers is stored in one database or in different databases, the storage location for each data center may be different. The computer may retrieve the required information from the virtual center database.

In some embodiments, the computer may launch a thread of operation for each virtual server management application. In other words, the executable binary file may be configured as a multi-threader capable of collecting data from multiple storage locations simultaneously. For each thread of operation, the computer may query a respective storage location corresponding to a particular virtual server management application for status and other information associated with the virtual server management application's virtual machines and may retrieve the set of data records corresponding to the queried information. For example, a first thread may be for a first virtual server management application and a second thread may be for a second virtual server management application contemporaneously. Using the multi-threaded application, the computer may contemporaneously pipe in data from multiple storage locations to ensure that there are updates in a reasonable amount of time. In other embodiments, the query may be sequential and the computer may query the virtual server management applications (and/or the databases associated therewith) in a sequential manner.

Conventional systems may have an agent or a virtual appliance on the backend. The virtual appliance is a virtual server, which has its own kernel and application layer. They require more sophisticated layer of interaction with the center database. The conventional systems may require installation of an application on the virtual server. After activation of the application, the functionality of the application may retrieve data. Thus, the conventional systems require a thick client to install the application and run the application.

In some configurations, the systems and methods described herein can operate without utilizing a virtual appliance. For example, the system may contain a light binary file (e.g., 250 kilobytes in size) that may operate offline and without a need for a virtual appliance that has its own kernel and application layer. The computer may connect to the virtual center database and retrieve data using standard commands and standard approaches but in a certain manner and collect the most critical information from the perspective of the virtual center server administrators. The computer may retrieve data without requiring any specific libraries, thick clients, binaries, or installation, and may be completely offline. In some embodiments, the computer may connect to the virtual center database and query data using PowerShell management framework. In some other embodiments, the computer may connect to the virtual center database and query data using vMware vSphere command line interface (VCLI).

In step 206, the computer may aggregate information received from the virtual center database (containing database records of one or more virtual server management applications) for each virtual machine. In some embodiments, input files received from the virtual center database and containing information from one or more virtual server management applications may be text files containing requested information in a space delimited or comma delimited format.

From the input files, the computer may process and aggregate different VM information to determine summary counters and statistic information. For example, the computer may provide or count the total number of VMs in a data center, the number of powered on VMs, and the number of powered off VMs based on the VM status information retrieved from the virtual center database.

In step 208, the computer may generate a snapshot view file based on the retrieved information. In some embodiments, the computer may generate the snapshot view file in a universal format, for example a hypertext markup language (HTML) format, such that a user may access the snapshot file through a web-browser. The computer may integrate the retrieved information and add HTML tags to generate the HTML file. The HTML file described herein is merely exemplary, and the computer may generate the snapshot view file in other computer readable format, such as PDF, CVS, Excel, NX file format, CSP (Cache Server Page) and the like.

The snapshot view may be able to provide easily readable information regarding the entire virtual infrastructure, which may comprise multiple virtual sub infrastructures in one consolidated dashboard. The snapshot view may provide the most critical and most important information in one shot, not only for a single data center, but for multiple data centers and all in one view. The snapshot view may be customized for the immediate analysis needs of the administrative users from the provisional perspective, from resource utilization perspective and from the system health status perspective.

In step 210, the computer may transmit the snapshot view file or a link thereto to one or more user devices. In some embodiments, the computer may upload the snapshot view file to a SharePoint server and generate a link to the file. The computer may then transmit the link to the user devices by forms of communications such as e-mail, instant messaging or any other form of electronic communication. In other embodiments, the computer may transmit the snapshot view file itself to the user devices for the user devices to store the snapshot view file locally.

In step 212, a user device may display the snapshot view on a GUI in response to a respective user selecting the transmitted file or link. For the snapshot view file in HTML format, a user can select a link to the file or select the file and the user device may display the snapshot view in a web browser such as Internet Explorer, Mozilla Firefox, Google Chrome, and/or Safari. In other words, the user device does not require a specialized application for the snapshot view and use an existing web browser. The GUI may work in a passive mode or an active mode. The GUI may include an interactive option for the user to choose working on either a passive or an active mode.

In a passive mode, the GUI may display the required information. In some embodiments, the GUI may display statistic information of multiple data centers comprising a plurality of virtual machines. In some other embodiment, the GUI may display detailed information regarding each individual virtual machine. The GUI may provide the customized information for certain virtual machines based on the user's request.

In an active mode, the input files may contain respective switches and individual virtual machines information allowing the user to perform various operations on the virtual machines. In other words, the computer may provide bi-directional functionalities. Besides retrieving relevant information from the virtual infrastructure and displaying the information on a GUI, the computer may receive instructions from the input file and perform operations on the virtual infrastructure to change the status of the virtual machines. The operations may include power on, power off, reset the PIN (personal identification number), provision new items within the database, and any other operations.

The computer may receive instructions from the user via the GUI displayed on the user's device and/or the input files stored in the computer. For example, the user may try to turn off a selected virtual machine by providing the respective switch settings with the name of the virtual machine in the input files. Alternatively or additionally, the user may interact with (e.g., clicking) a corresponding button associated with the selected virtual machine. The computer may make corresponding changes in the virtual center database and interact with virtual machines through the database. In operation, the computer may connect into the database, change records corresponding to the instructions in the database, interact with the virtual machine by sending the command of the status changing to the virtual machine, and receive a response from the virtual machine. Based on the command, the corresponding virtual machine may perform the operations, such as powering off. The computer may reflect the changes in an updated report by collecting an updated virtual machine status. The computer may receive a response from the virtual machine on whether the operation is successful or failed.

Figure 3:
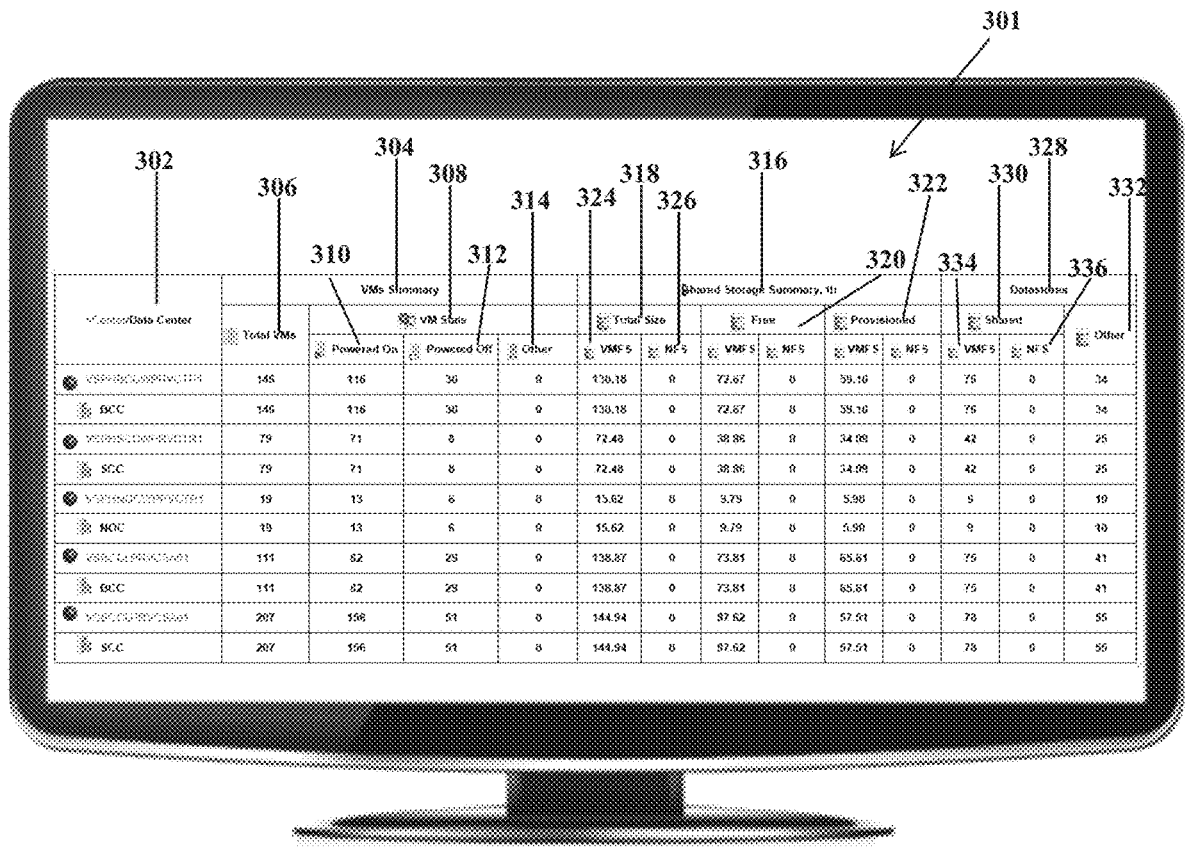
FIG. 3 shows an illustrative graphical user interface (GUI) showing a first illustrative snapshot view of a virtual infrastructure.

FIG. 3 shows a GUI 300 with a first illustrative snapshot view 301 of the virtual infrastructure. The snapshot view 301 may have been generated by a computer using the illustrative methods and illustrative principles described herein. The snapshot view 301, as shown herein, may display a summary of various data centers comprising a plurality of virtual machines in the virtual infrastructure.

For instance, the snapshot view 301 may display statistic information of multiple data centers. In this example, the snapshot view 301 displays summary counters of five data centers 302 within the virtual infrastructure. For each data center, the snapshot view 301 may display VMs summary 304, including the summary counters of total VMs 306 in the data center, the number of VMs in different VM states 308. Specifically, the VM states may include powered on state, powered off state, and other state. The snapshot view 301 may display the number of VMs in powered on state 310, the number of VMs in powered off state 312, and the number of VMs in other state 314. For example, there are 146 VMs within the first data center, with 116 VMs being powered on, 30 VMs being powered off.

Additionally, the snapshot view 301 may display the shared storage summary 316 within each data center. The shared storage summary may include three categories: total size storage 318, free storage 320, and provisioned storage 322. Within each category, the snapshot view 301 may display the size of VMFS (virtual machine file system) 324 and NFS (network file system) 326.

Furthermore, the snapshot view 301 may also display datastores 328 for each data center. The datastores 328 may include shared datastores 330 and other datastores 332. Within the shared datastores 332, the snapshot view 301 may display the datastores for VMFS (virtual machine file system) 334 and NFS (network file system) 336.

Figure 4:
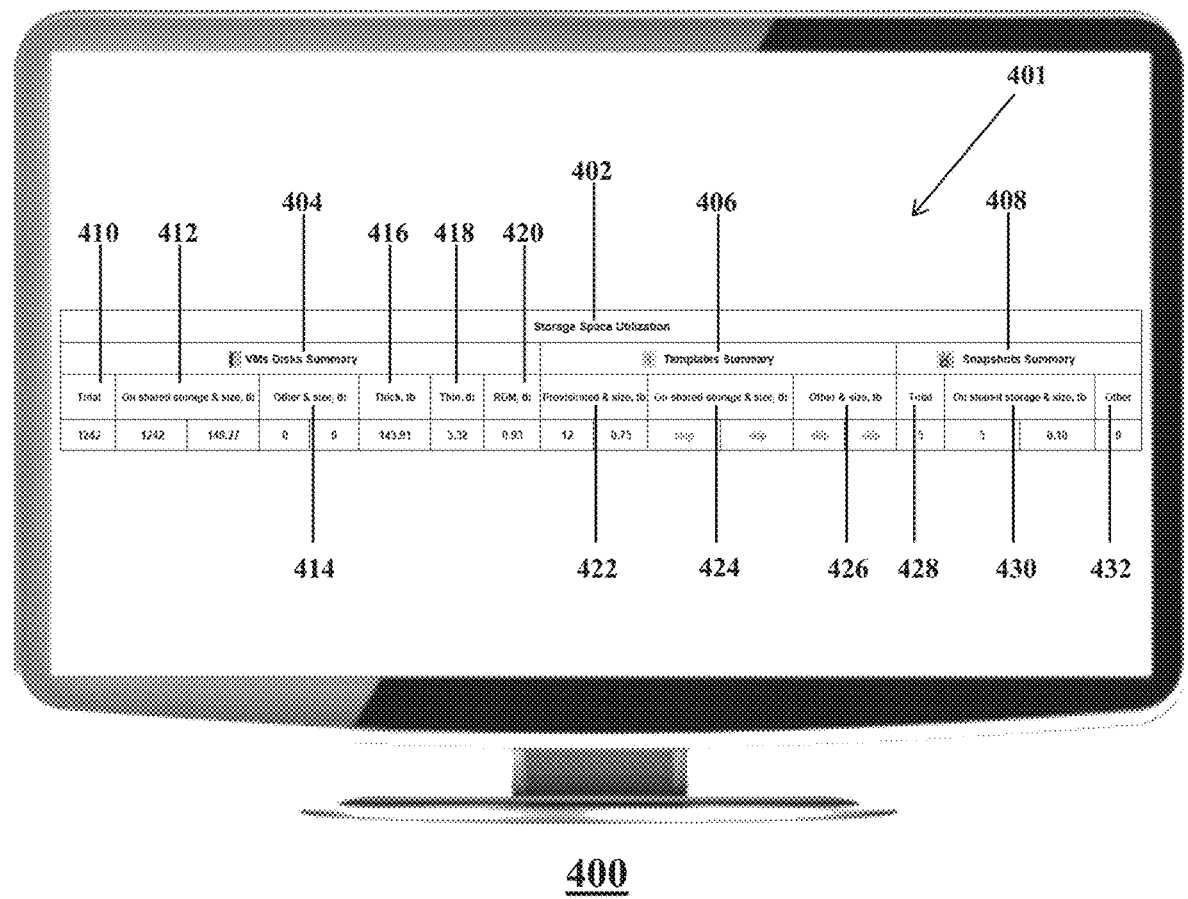
FIG. 4 shows an illustrative graphical user interface showing a second illustrative snapshot view of a virtual infrastructure.

FIG. 4 shows a GUI 400 with a second illustrative snapshot view 401 of the virtual infrastructure. The snapshot view 401 may have been generated by a computer using the illustrative methods and illustrative principles described herein. The snapshot view 401, as shown herein, may display the storage space utilization summary 402, including the VM disks summary 404, the VM templates summary 406, and the VM snapshots summary 408. The VM disk summary 404 may include total disk 410, on shared storage and size 412, other storage and size 414, thick storage 416, thin storage 418, RDM 420. The VM templates summary 406 may include provisioned storage and size 422, on shared storage and size 424, other storage and size 426. The VM snapshots summary 408 may include total storage 428, on shared storage and size 430 and other storage 432.

Figure 5:
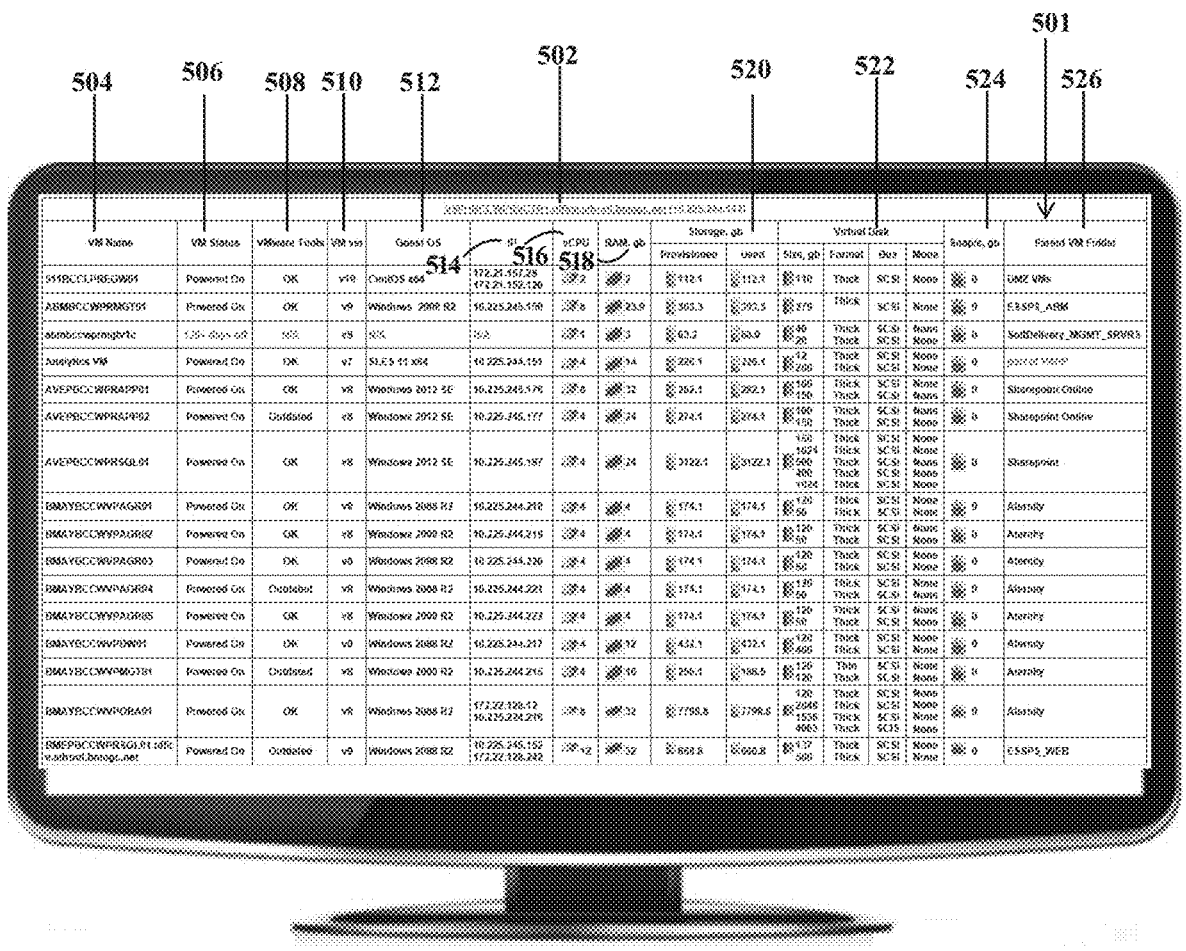
FIG. 5 shows an illustrative graphical user interface showing a third illustrative snapshot view of a virtual infrastructure.

FIG. 5 shows a GUI 500 with a third illustrative snapshot view 501 of the virtual infrastructure. The snapshot view 501 may have been generated by a computer using the illustrative methods and illustrative principles described herein. The snapshot view 501, as shown herein, may display detailed information regarding each individual VM within a data center 502 of the virtual infrastructure. For each VM, the snapshot view 501 may display the VM name 504, the VM status 506, the VMware (virtual machine hardware) tools 508, the VM version 510, the guest operating system 512, IP address 514, virtual CPU (central processing unit) 516, RAM (random access memory) 518, storage 520 including provisioned storage and used storage, the virtual disk 522 including size, format, bus, and mode, the snapshots 524, and parent VM folder 526.

The illustrative snapshot views 401, 501 may color code the display to indicate the health of the respective virtual machine. To indicate the health state of a virtual machine, the snapshot views 401, 501 may display informational status, such as indicating that the virtual machine is turned off, in a neutral color such as white or beige, indicating that the virtual machine is powered on in green. The snapshot views 401, 501 may indicate that the virtual machine has no issues in green, warnings in yellow, and critical condition in red. It should be understood that these color codes are merely illustrative, and other color codes may be used without deviating from the scope of this disclosure.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for generating a snapshot view containing virtual machine information and status of a virtual infrastructure, the method comprising:
   receiving, by a computer, a request to generate the snapshot view, wherein the request includes identifiers of a plurality of data centers, a plurality of virtual machines in a data center in a network infrastructure of the plurality of data centers, virtual machine status of the plurality of virtual machines of the data center, and storage utilization information for the data center;
   querying, by the computer from a database based on the request, a storage location corresponding to a virtual server management application in the data center of the plurality of data centers to retrieve a set of data records containing information and status of the plurality of virtual machines within the network infrastructure for the data center;
   generating, by the computer, a snapshot view file of the virtual infrastructure based upon the set of data records for the data center of the plurality of data centers, wherein the snapshot view file includes statistics data of the data center of the plurality of data centers including the virtual machine status and storage utilization information of the plurality of virtual machines of the data center of the plurality of data centers indicated by the request; and
   transmitting, by the computer to a user device, an electronic communication containing a selectable link configured to retrieve the snapshot view file from the computer and cause the user device to generate the snapshot view using the snapshot view file.

2. The method of claim 1, further comprising:
   launching, by the computer, an executable binary file of the request in task scheduler for an automated run.

3. The method of claim 1, further comprising:
   launching, by the computer, an executable binary file of the request from a command line interface.

4. The method of claim 1, wherein the set of data records comprises partial information of each virtual machine including virtual machine status and storage utilization information.

5. The method of claim 1, wherein the snapshot view file of the virtual infrastructure comprises storage utilization summary including virtual machine disks summary, virtual machine templates, and virtual machine snapshots summary.

6. The method of claim 1, further comprising:
   querying, by the computer from the database, detailed information corresponding to each individual virtual machine; and
   displaying, by the computer, the detailed information corresponding to each individual virtual machine in the snapshot view.

7. The method of claim 1, wherein the snapshot view file is in the format of one of the following formats: PDF, Excel, CSV, CSP, or NX.

8. The method of claim 1, further comprising:
   transmitting, by the computer, the electronic communication via e-mail or instant messaging.

9. The method of claim 1, wherein the user device displays the snapshot view on a web browser application.

10. A system comprising:
    a non-transitory storage medium configured to store a snapshot view engine;
    a processor connected to the non-transitory storage medium and configured to execute the snapshot view engine to:
       receive a request to generate the snapshot view, wherein the request includes identifiers of a plurality of data centers, a plurality of virtual machines in a data center in a network infrastructure of the plurality of data centers, virtual machine status of the plurality of virtual machines of the data center, and storage utilization information for the data center;
       query, from a database based on the request, a storage location corresponding to a virtual server management application in the data center of the plurality of data centers to retrieve a set of data records containing information and status of the plurality of virtual machines within the network infrastructure for the data center;
       generate a snapshot view file of the virtual infrastructure based upon the set of data records for the data center of the plurality of data centers, wherein the snapshot view file includes statistics data of the data center of the plurality of data centers including the virtual machine status and storage utilization information of the plurality of virtual machines of the data center of the plurality of data centers indicated by the request; and
       transmit, to a user device, an electronic communication containing a selectable link configured to retrieve the snapshot view file from the computer and cause the user device to generate the snapshot view using the snapshot view file.

11. The system of claim 10, wherein the processor is configured to further execute the snapshot view engine to:
launch an executable binary file of the request in task scheduler for automated run.

12. The system of claim 10, wherein the processor is configured to further execute the snapshot view engine to:
launch an executable binary file of the request from a command line interface.

13. The system of claim 10, wherein the set of data records comprises partial information of each virtual machine including virtual machine status and storage utilization information.

14. The system of claim 10, wherein the snapshot view file of the virtual infrastructure comprises storage utilization summary including virtual machine disks summary, virtual machine templates, and virtual machine snapshots summary.

15. The system of claim 10, wherein the processor is configured to further execute the snapshot view engine to:
query, from the database, detailed information corresponding to each individual virtual machine; and
display the detailed information corresponding to each individual virtual machine in the snapshot view.

16. The system of claim 10, wherein the snapshot view file is in the format of one of the following formats: PDF, Excel, CSV, CSP, or NX.

17. The system of claim 10, wherein the processor is configured to further execute the snapshot view engine to:
transmit the electronic communication via e-mail or instant messaging.

18. The system of claim 10, wherein the user device displays the snapshot view on a web browser application.

* * * * *